United States Patent [19]

Keogh

[11] Patent Number: 4,767,820
[45] Date of Patent: Aug. 30, 1988

[54] COMPOSITIONS OF A RELATIVELY WATER-STABLE THERMOPLASTIC POLYMER AND TETRAMETHYL TITANATE DISPERSED IN AN ALKYLENE-ALKYL ACRYLATE COPOLYMER MATRIX

[75] Inventor: Michael J. Keogh, Bridgewater, N.J.

[73] Assignee: Union Carbide Corporation, Danbury, Conn.

[21] Appl. No.: 9,881

[22] Filed: Feb. 2, 1987

Related U.S. Application Data

[63] Continuation-in-part of Ser. No. 767,642, Aug. 20, 1985, abandoned, which is a continuation-in-part of Ser. No. 669,754, Nov. 9, 1984, Pat. No. 4,579,913, which is a continuation-in-part of Ser. No. 534,354, Sep. 23, 1983, Pat. No. 4,526,930.

[51] Int. Cl.$^4$ .............................................. C08L 51/06
[52] U.S. Cl. ........................................ 525/72; 525/80; 525/195; 525/209; 525/370
[58] Field of Search ................................. 525/72, 195

[56] References Cited

U.S. PATENT DOCUMENTS

| | | | |
|---|---|---|---|
| 3,646,155 | 2/1972 | Scott | 260/827 |
| 4,291,136 | 9/1981 | Keogh | 525/102 |
| 4,328,323 | 5/1982 | Keogh | 525/105 |
| 4,369,289 | 1/1983 | Keogh | 525/106 |
| 4,412,042 | 10/1983 | Matsuura et al. | 525/288 |
| 4,558,094 | 12/1985 | Deguchi et al. | 525/72 |
| 4,598,116 | 7/1986 | Keogh et al. | 525/106 |

FOREIGN PATENT DOCUMENTS 0151103  9/1982  Japan .................................... 525/72

Primary Examiner—Wilbert J. Briggs, Sr.
Attorney, Agent, or Firm—J. C. Arvantes

[57] ABSTRACT

Compositions of relatively water-stable thermoplastic polymers having hydrolyzable, pendant silane moieties and tetramethyl titanate dispersed in a normally solid alkylene-alkyl acrylate copolymer matrix. These compositions are useful as extrudates about wires and cables, water-curing in a relatively short period of time to crosslinked products.

8 Claims, No Drawings

COMPOSITIONS OF A RELATIVELY WATER-STABLE THERMOPLASTIC POLYMER AND TETRAMETHYL TITANATE DISPERSED IN AN ALKYLENE-ALKYL ACRYLATE COPOLYMER MATRIX

This application is a continuation-in-part of application Ser. No. 767,642 filed Aug. 20, 1985, abandoned, which is a continuation-in-part of application Ser. No. 669,754 filed Nov. 9, 1984, now U.S. Pat. No. 4,579,931, which is a continuation-in-part of application Ser. No. 534,354 filed Sept. 23, 1983, now U.S. Pat. No. 4,526,930.

SUMMARY OF THE INVENTION

This invention relates to compositions of a relatively water-stable thermoplastic polymer and tetramethyl titanate dispersed in a normally solid alkylene-alkyl acrylate copolymer matrix. The compositions of this invention are particularly useful as extrudates about wires and cables providing coverings thereon which can be water-cured in a readily short period of time to crosslinked products.

BACKGROUND OF THE INVENTION

Water-curable compositions, based on thermoplastic polymers having hydrolyzable silane moieties are becoming increasingly attractive, on a commercial scale, as it is possible to extrude such compositions, as for example, about wires and cables under a wide variety of processing conditions not possible with compositions containing organic peroxides. Furthermore, coverings on wires and cables extruded from water-curable compositions can be cured or crosslinked by a simple operation wherein the covered wire is passed through a heated water-bath.

One disadvantage of water-curable compositions, however, is the water sensitivity of these compositions. Compositions containing water-curable thermoplastic polymers having hydrolyzable silane moieties tend to crosslink under normal conditions of handling and storage. As a result, the relatively poor shelf life of such compositions has tended to limit the wide commercial acceptance of such compositions, particularly in the United States.

Modification of water-curable compositions, in order to alleviate the problem of premature crosslinking, is described in my U.S. Pat. No. 4,526,930, patented July 2, 1985. According to U.S. Pat. No. 4,526,930, compositions are formulated, containing relatively water-stable thermoplastic polymers having hydrolyzable silane moieties, which are only activated or made readily water-curable by the reaction therewith of an organo titanate having at least one readily hydrolyzable group, which ester exchanges with an ester group of the silane.

DETAILED DESCRIPTION OF THE INVENTION

The present invention provides water-curable compositions which are characterized by even faster cure speeds than the compositions of U.S. Pat. No. 4,526,930.

The compositions of the present invention comprise a relatively water-stable, thermoplastic polymer having pendant thereto silane moieties of the formula:

FORMULA I wherein R is a straight or branched chain hydrocarbon radical having a minimum of 4 carbon atoms and is attached to the oxygen atom through an external carbon, generally having 4 to 18 carbon atoms inclusive, or a branched chain hydrocarbon radical having a minimum of 3 carbon atoms and is attached to the oxygen atom through an internal carbon, generally having 3 to 18 carbon atoms inclusive, and tetramethyl titanate dispersed in a normally solid alkylene-alkyl acrylate copolymer matrix.

The dispersion of titanate in the matrix is prepared by mixing the titanate together with the matrix at a temperature sufficient for the titanate and matrix to react with each other, e.g., a temperature in the range of about 150° C. to about 250° C. The reaction mechanism is believed to involve the exchange of methoxy groups located in the high melting titanate for ethoxy groups located in the alkylene-alkyl acrylate. The ethoxy groups lower the melting point of the titanate so that it can easily be dispersed in the alkylene-alkyl acrylate matrix and function as a silanol condensation catalyst.

With respect to Formula I, illustrative of suitable straight chain hydrocarbon radicals for R are alkyl radicals such as n-butyl, n-hexyl, n-heptyl, n-octyl, n-nonyl, n-decyl, n-dodecyl, stearyl, myristyl and the like.

Illustrative of suitable branched chain hydrocarbon radicals for R are alkyl radicals such as isopropyl, sec-butyl, sec-amyl, 4-methyl-2-pentyl and the like.

Each V, which can be the same or different, is a hydrocarbon radical having 1 to 18 carbon atoms inclusive or -(OR) wherein R is as previously defined.

Illustrative of suitable hydrocarbon radicals for each V are alkyl radicals having 1 to 18 carbon atoms inclusive, preferably 1 to 6 carbon atoms inclusive such as methyl, ethyl, n-propyl, isopropyl, n-butyl, n-hexyl and the like; aryl radicals having 6 to 8 carbon atoms inclusive such as phenyl, methylphenyl, ethylphenyl and the like; cycloaliphatic radicals having 5 to 8 carbon atoms inclusive such as cyclopentyl, cyclohexyl and the like.

Preparation of thermoplastic polymers having pendant silane moieties falling within the scope of Formula I can be carried out by a number of convenient processes, utilizing free radical generating compounds, including:

A. Reacting a thermoplastic polymer with an appropriate vinyl silane in the presence of an organic peroxide as described in U.S. Pat. No. 3,646,155, patented Feb. 29, 1972.

B. Reacting an olefinic monomer with an appropriate unsaturated silane in the presence of a peroxide as described in U.S. Pat. No. 3,225,018, patented Dec. 21, 1965.

Illustrative of thermoplastic polymers which can be reacted with silanes, according to Process A, identified above, are normally solid homopolymers and interpolymers of monoolefins and diolefins.

Suitable polymerizable monoolefins have the general formula:

FORMULA II wherein α has a value of at least 2. Exemplary of olefins falling within the scope of Formula II are: ethylene, propylene, butene-1, pentene-1,4 -methyl-pentene-1, hexene-1, heptene-1, octene-1 and the like.

Suitable polymerizable diolefins have the general formula:

$$C_\beta H_{2\beta-2} \quad \text{FORMULA III}$$

wherein β has a value of at least 3. Exemplary of diolefins falling within the scope of Formula III are: 1,4-pentadiene, 1,4-hexadiene, 1,5-hexadiene, 1,4-octadiene, ethylidene norbornene and the like.

Illustrative of monomers which can be polymerized with monoolefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride, and vinylacetate; alkyl acrylates which fall within the scope of the following formula:

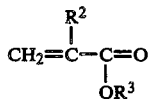

FORMULA IV wherein $R^2$ is hydrogen or methyl and $R^3$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

Desirable polymers are alkylene-alkyl acrylate copolymers generally having a density (ASTM D-1505 with conditioning as in ASTM D-147-42) of about 0.92 to about 0.94 and a melt index (ASTM D-1238 at 44 psi tested pressure) of about 0.1 to about 500 decigrams per minute. These copolymers generally have about 1 to about 60 percent by weight combined alkyl acrylate, preferably about 5 to about 45 percent by weight combined alkyl acrylate.

Preferred polymers are ethylene-propylene copolymers, ethylene-butene copolymers, ethylene-hexene copolymers and the like produced under low pressures on the order of about 15 to about 300 psi, using a chromium oxide catalyst modified with titanium as disclosed in U.S. Pat. No. 4,011,382, patented Mar. 8, 1977.

Particularly preferred polymers have densities (ASTM D-1505) of about 0.875 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins as previously described.

It is to be understood that mixtures of reactants can be polymerized to produce suitable polymers.

Illustrative of monomers and mixtures thereof to be reacted with an appropriate silane in accordance with Process B are the olefinic monomers previously described.

Silanes suitable for purposes of this invention include, among others, silanes having the formula:

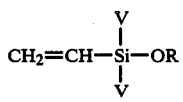

FORMULA V wherein R and V are as previously defined, such as vinyl-tris(isopropoxy) silane, vinyl-tris(n-butoxy) silane, vinyl-tris(sec-butoxy) silane, vinyl-tris(isobutoxy) silane, vinyl-tris(n-pentoxy) silane, vinyl-tris(n-hexoxy) silane, vinyl-tris(2-ethylhexoxy-1) silane, vinyl-tris(n-heptoxy) silane, vinyl-tris(n-octyl) silane, vinyl-tris(n-dodecyloxy) silane, vinyl-bis(n-butoxy)methyl silane, vinyl-bis(n-pentoxy)methyl silane, vinyl-bis(n-hexoxy)methyl silane, vinyl-(n-butoxy)dimethyl silane, vinyl(n-pentoxy)dimethyl silane and the like; unsaturated silanes having the formula:

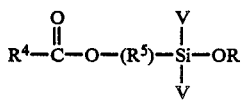

FORMULA VI wherein $R^4$ is an unsaturated hydrocarbon radical such as an alkylene radical having 2 to 18 carbon atoms inclusive, preferably 2 to 4 carbon atoms inclusive such as ethylene, propylene and the like, and R and each V are as previously defined.

Illustrative of suitable radicals for $R^5$ are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyoxypropyl, ethyloxyethyl, ethyloxypropyl, propyloxypropyl, propyloxybutyl, propyloxyhexyl and the like.

Exemplary of suitable silanes falling within the scope of Formula VI are the following:

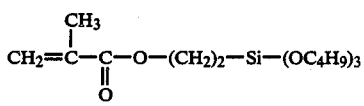

β-methacryloxyethyl-tris(n-butoxy) silane

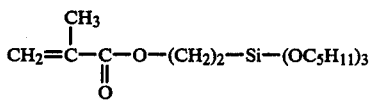

γ-methacryloxyethyl-tris(n-pentoxy) silane

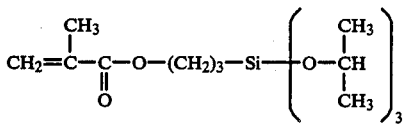

γ-methacryloxypropyltris(isopropoxy) silane

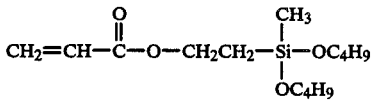

acryloxyethyl-bis(n-butoxy)methyl silane

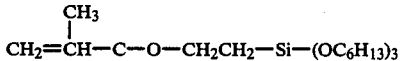

β-methacryloxyethyl-tris(n-hexoxy) silane

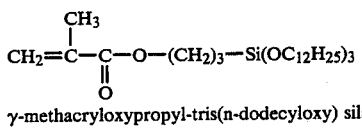

γ-methacryloxypropyl-tris(n-dodecyloxy) silane

Normally solid alkylene-alkyl acrylate copolymers which serve as matrices for the tetramethyl titanate are known compounds produced by reacting monoolefins of Formula II with compounds of Formula IV.

The reaction of a relatively water-stable thermoplastic polymer, as defined, with tetramethyl titanate (dispersed in a matrix of an alkylene-alkyl acrylate copolymer) to produce readily water-curable polymers can be conveniently carried out in an apparatus in which the polymer is subjected to mechanical working such as a Banbury mixer, a Brabender mixer or an extruder.

The amount of tetramethyl titanate used is sufficient to ester exchange at least one ester group of the titanate for one ester group of the silane. Generally, the amount used is about 0.1 to about 20 percent by weight, preferably about 1 to about 5 percent by weight, based on the weight of the thermoplastic polymer.

The temperature at which this reaction is carried out is not critical and can vary, conveniently, from about 80° C. to about 300° C., and preferably from about 150° to about 230° C.

The reaction can be carried out at atmospheric, subatmospheric or superatmospheric pressure, although superatmospheric pressure is preferred, generally up to about 10,000 psi.

Recovery of the silane modified polymer is effected by allowing the contents of the reaction flask to cool and discharging into a suitable receiver for storage, preferably under an inert gas blanket.

The curing or crosslinking of the resultant silane modified polymer is effected by exposing the polymer to moisture. The moisture present in the atmosphere is usually sufficient to permit curing to occur over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at significant rates in the absence of added silanol condensation catalyst. The organo titanate reactant present also catalyzes the crosslinking reaction.

Alternatively, a wide variety of materials which function as silanol condensation catalysts and which are known in the art can be employed in the crosslinking process. Such materials include metal carboxylates described in U.S. Pat. No. 4,328,323 and include dibutyltin dilaurate and the like.

To the compositions of this invention may be added various additives, in amounts well known in the art, such as fillers among which can be mentioned carbon black, clay, talc (magnesium silicate), calcium carbonate, silica, aluminum hydroxide, magnesium hydroxide and the like.

The polymers can be rendered flame retardant by the addition thereto of halogen containing flame retardants such as decabromodiphenyl oxide, chlorinated polyethylene, polyvinyl chloride and halogenated paraffin waxes, alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosures of all patents noted are incorporated herein by reference. Also, mixtures of materials can be used in carrying out this invention.

The data which follow demonstrate the enhanced activation of a relatively water-stable thermoplastic polymer by tetramethyl titanate dispersed in an alkylene-alkyl acrylate copolymer matrix.

A—preparation of a relatively water-stable ethylene-ethyl acrylate copolymer having pendant hydrolyzable silane moieties by grafting a vinyl silane to an ethylene-ethyl acrylate copolymer.

A mixture, identified below, was reacted in a Banbury mixer for five minutes at a temperature of 185° C.

|  | Percent by Weight |
|---|---|
| Ethylene-ethyl acrylate copolymer containing 18 percent by weight combined ethyl acrylate | 97.4 |
| Vinyl-tris(2-ethylhexoxy) silane | 2.0 |
| Di-α-cumyl peroxide | 0.5 |
| Polymerized 1,2-dihydro-2,3,4-trimethyl quinoline (antioxidant) | 0.1 |

A sample of the resultant ethylene-ethyl acrylate copolymer having pendant hydrolyzable silane moieties was formed into test plaques having dimensions of 3 inches by 3 inches by 0.075 inch in a press under the following conditions:

Time of Cycle—5 minutes
Temperature—110° C.–115° C.
Pressure—5,000 psig and subjected to the Monsanto Rheometer test. This test is described in U.S. Pat. No. 4,018,852 to Donald L. Schober, patented Apr. 19, 1977.

The ethylene-ethyl acrylate copolymer, as prepared, had a Rheometer reading of 3 lbs-inch.

B—Formulation of a composition containing the relatively water-stable ethylene-ethyl acrylate copolymer of A.

|  | Percent by Weight |
|---|---|
| Relatively water-stable ethylene-ethyl acrylate copolymer of A | 41.6 |
| Aluminum trihydrate | 55.5 |
| Methyl triethoxy silane (coupling agent) | 1.0 |
| 2-Ethylhexyl diphenyl phosphate (plasticizer) | 1.5 |
| Polymerized 1,2-dihydro-2,3,4-trimethyl quinoline | 0.4 |

The Formulation described above (B) was mixed in a Brabender mixer for three minutes at a temperature of 140° C.

C—Activation of Formulation B

Formulation B was fluxed in a Brabender mixer to a temperature of 140° C. To the fluxed material there was then added tetramethyl titanate in a normally solid ethylene-ethyl acrylate copolymer matrix or tetramethyl titanate per se, as indicated below. In each case, the temperature of the resultant mixture raised to 165° C., over a period of one minute, and held at this temperature for 3 minutes.

Contents of the Brabender were discharged, formed into plaques, in a manner previously described, and subjected to the Monsanto Rheometer test. Test results are set forth in Table I.

TABLE I

| | Percent by Weight | |
|---|---|---|
| Formulation B | 97.0 | 98.8 |
| Tetramethyl titanate in a matrix of a normally solid ethylene-ethyl acrylate copolymer | 3.0 | — |
| Tetramethyl titanate (powdered solid) | — | 1.2 |
| Rheometer | | |
| as prepared | 9 | 8.5 |
| immersed for one hour in 90° C. water | 27 | 10 |
| immersed for 16 hours in 90° C. water | 29 | 10 |

The masterbatch was prepared by adding 40 parts by weight tetramethyl titanate to 60 parts by weight of a fluxed normally solid ethylene-ethyl acrylate copolymer and containing 18 percent by weight combined ethyl acrylate. The mixture was mixed in a Brabender mixer for 5 minutes at a temperature of 200° C. The contents of the Brabender mixer were discharged and ground in a Wiley mill.

What is claimed is:

1. A composition of matter comprising a preformed, thermoplastic polymer, said polymer being a homopolymer or interpolymer of one or more monoolefins or diolefins and having pendant silane moieties of the formula:

wherein R is a straight or branched chain hydrocarbon radical having a minimum of 4 carbon atoms attached to the oxygen atom through an external carbon or a hydrocarbon radical having a minimum of 3 carbon atoms attached to the oxygen atom through an internal carbon, and each V is a hydrocarbon radical having 1 to 18 carbon atoms or an —OR radical wherein R is as previously defined; and, dispersed in a normally solid alkylene-alkyl acrylate copolymer matrix wherein the alkylene moiety has 2 to 8 carbon atoms, the reaction product of tetramethyl titanate and the matrix, said reaction product being formed at a temperature sufficient for the titanate to react with the matrix wherein the tetramethyl titanate is present in an amount sufficient to ester exchange one ester group of the titanate for one ester group of the silane.

2. A composition of matter as defined in claim 1 wherein the said titanate is present in an amount of about 0.1 to about 20 percent by weight based on the weight of said polymer.

3. A composition of matter as defined in claim 1 wherein the said titanate is present in an amount of about 1 to about 5 percent by weight based on the weight of said polymer.

4. A composition of matter as defined in claim 1 wherein the alkylene-alkyl acrylate copolymer is an ethylene-ethyl acrylate copolymer.

5. A composition of matter as defined in claim 1 wherein the silane moieties of the thermoplastic polymer are derived from vinyl-tris(2-ethylhexoxy) silane.

6. A composition of matter as defined in claim 1 wherein the said preformed thermoplastic polymer is an ethylene-ethyl acrylate copolymer having grafted thereto vinyl-tris(2-ethylhexoxy) silane.

7. A composition of matter as defined in claim 6 wherein the said titanate is present in an amount of about 0.1 to about 20 percent by weight based on the weight of said polymer.

8. A composition of matter as defined in claim 6 wherein the said titanate is present in an amount of about 1 to about 5 percent by weight based on the weight of said polymer.

* * * * *